Feb. 6, 1940.                D. M. HART                2,189,490
                            WATER HEATER
                         Filed June 17, 1938
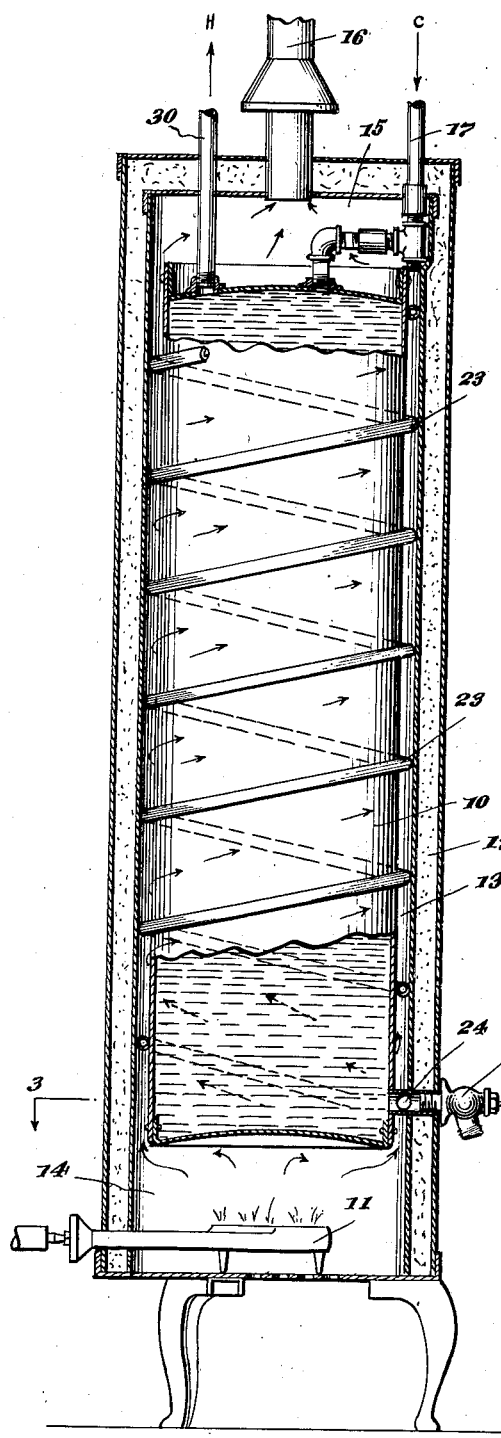
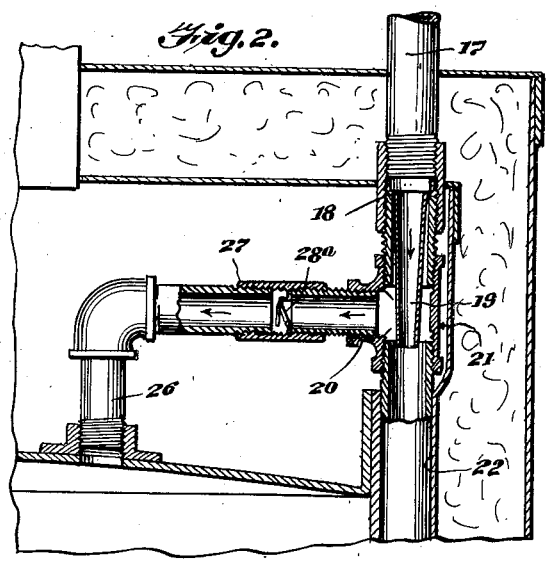
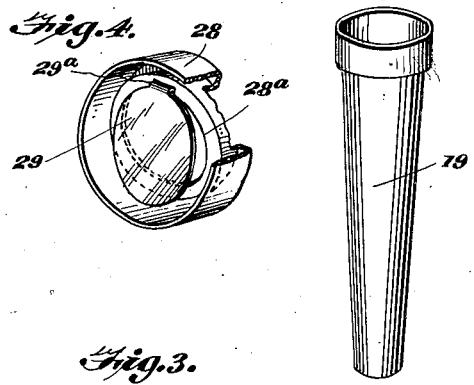
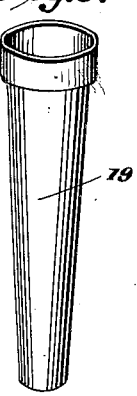
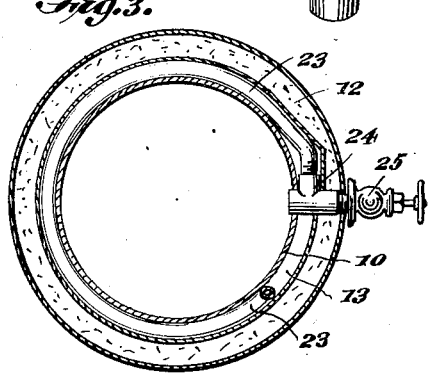
DAVID M. HART
INVENTOR
BY Clyde L. Rogers
his ATTORNEY Patented Feb. 6, 1940

2,189,490

UNITED STATES PATENT OFFICE 2,189,490

WATER HEATER

David M. Hart, Los Angeles, Calif.

Application June 17, 1938, Serial No. 214,293

2 Claims. (Cl. 126—362)

This invention relates to storage water heaters, of a type commonly employed for providing a constant supply of domestic hot water and embodying an upright tank with a heater thereunder, and enclosed in a heat insulating shell or housing. A principal object of the invention is to provide a water heater of this type designed to obtain the highest possible degree of heat transference from the combustion unit and the flue therefrom, to the water in the tank, and that being delivered to the tank. In accordance with my invention I provide means whereby the heat and gases from the combustion unit are directed in a circuitous path upward from the combustion unit and in extended contact with a cold water inlet pipe which delivers the water to the bottom of the tank. A further feature of the invention relates to improved means for providing a circulation of water between the tank and the circuitous inlet pipe in one direction when the water is not being drawn from the tank, and providing for the passage of fresh water in the opposite direction from the pipe to the tank as water is withdrawn from the tank; this latter feature including an improved and novel construction of valve control in the pipe connections. A still further feature of the invention comprises the use of a spiral water inlet pipe to the bottom of the tank which is arranged to serve as a spacer between the tank and its insulating shell. The foregoing and other objects and advantages of the invention will be better understood from the following detailed description taken in connection with the accompanying drawing, and the distinctive features of novelty will be thereafter pointed out in the appended claims.

Referring to the drawing,

Figure 1 is a central vertical section illustrating an apparatus embodying the invention, certain interior parts being shown in elevation;

Figure 2 is a fragmentary detail view partly in elevation and partly in vertical section on a larger scale showing the piping and valve arrangement for controlling the inlet and circulation of the water;

Figure 3 is a transverse section on line 3—3 of Figure 1;

Figure 4 is a perspective detail with a portion broken away, showing an improved valve device employed with the invention, and;

Figure 5 is a perspective detail, showing a jet member employed in the introduction of the cold water to the system.

10 indicates a storage tank for domestic hot water, generally of usual upright type having a gas burner unit 11 mounted thereunder, and an insulating shell 12 enclosing the tank with an annular flue space 13 extending from the combustion area 14 below the tank to the off-take flue area 15 at the top of the tank, the latter communicating with a suitable off-take flue 16 for the products of combustion. 17 denotes the cold water supply pipe to the tank to which is secured a fitting 18, secured in place an injector comprising a conical discharge jet tube 19. The jet tube 19 extends downward through and past the transverse opening 20 of a T fitting 21, and discharges the water into a pipe 22 threaded into the through portion of the T 21. The pipe 22 is continued as a spiral coil 23 extending around the tank 10 from top to bottom thereof, this pipe thus serving as a spacer between the tank and the insulating shell 12, the pipe being for this purpose of a dimension to fit quite closely between the tank and the insulating shell. The lower extremity of the spiral coil 23 discharges into the bottom of the tank through a fitting indicated at 24, shown as equipped with a usual drain cock 25. The transverse opening 20 of the T 21 has fitted therein a pipe connection 26 leading to the top of the tank. This pipe connection has interposed therein and held in place by a connecting sleeve 27, a valve device embodying a flanged ring or collar 28 equipped with a valve seat 28a which slopes downwardly toward the opening 20. A gate valve 29 is hinged at its top as seen at 29a to engage the valve seat 28a, and control the opening therethrough. It will be noted that this valve thus tends to depend straight downward from the hinge 29a by gravity, and so to remain open, permitting passage of water freely therethrough to the tank, but any water current set up in the pipe 26 in the reverse direction or outward from the tank, will act on such valve to press it to its seat and thus stop any flow of hot water outward from the tank. 30 denotes the pipe connection for delivering hot water from the top of the tank.

With the described construction, the spiral pipe 23 defines a spiral circuitous annular passage for the heated gases and products of combustion from the burner 11 to the off-take flue 16, and the cold water from inlet pipe 17 circulating downward through the coil 23 is adapted to extract the greatest possible amount of heat from the gases, since as the gases lose heat on moving progressively upward they come in contact with a progressively cooler portion of the coil 23 until they finally escape into the space 15. By reason of the close fit of the coil 23 in the annular space ...lating shell, the
...ced relation with
...tire unit thus con-
...assembled relation.
...ve controlled bypass
...tion of the arrows in
...re 2 is provided when
...o that a quick recovery
...hot water at the top of
...ate use is made available
...k has been re-heated. This
...urse, promoted by the action
...es on the spiral coil 23 which
...he cooler water from the bottom
...ward to the top thereof. By the
...the injector jet 19 in conjunction
...ve 29, it is insured that the fresh
...d water will be delivered directly to
...the tank through the coil 23 with-
...of the cold water passing through
...26 into the top of the tank.

...aware that the invention may be em-
bodied in other specific forms without departing
from the spirit or essential attributes thereof,
and I therefore desire the present embodiment
to be considered in all respects as illustrative and
not restrictive, reference being had to the ap-
pended claims rather than to the foregoing de-
scription to indicate the scope of the invention.

Having now described my invention, what I claim as new and desire to secure by Letters Patent is:

1. A water heater comprising an upright tank having a burner mounted thereunder, an insulating shell enclosing said tank and annularly spaced therefrom, a cold water supply pipe at the top of the tank equipped with an injector device and thence leading downward in a spiral encircling the tank to the bottom thereof, and connected to discharge water into the lower portion of the tank, said pipe defining a spiral annular off-take for the products of combustion leading to a discharge flue at the top of the tank, and a check valve controlled by-pass from said inlet pipe directly to the top of the tank constructed and arranged to permit circulation of water through said spiral into the top of the tank when water is not being drawn off, but to prevent passage of water from the tank top therethrough when fresh water is being admitted through the inlet pipe, said check valve being in position to be closed by the action of said injector device.

2. A water heater as defined in claim 1, wherein the spirally disposed water inlet pipe encircling the tank also serves as a spacer between the tank and its insulating shell.

DAVID M. HART.